United States Patent
Freund et al.

(10) Patent No.: US 10,600,140 B2
(45) Date of Patent: Mar. 24, 2020

(54) METHOD FOR SELECTING A DISPLAY CAPTURING MODE

(71) Applicant: BLADE, Paris (FR)

(72) Inventors: Emmanuel Freund, Paris (FR); Asher Criou, Neuilly sur Seine (FR)

(73) Assignee: BLADE, Paris (FR)

( * ) Notice: Subject to any disclaimer, the term of this patent is extended or adjusted under 35 U.S.C. 154(b) by 0 days.

(21) Appl. No.: 15/424,491

(22) Filed: Feb. 3, 2017

(65) Prior Publication Data

US 2017/0228851 A1    Aug. 10, 2017

(30) Foreign Application Priority Data

Feb. 4, 2016    (FR) ...................................... 16 50883

(51) Int. Cl.
| | |
|---|---|
| *G06T 1/00* | (2006.01) |
| *G06T 1/20* | (2006.01) |
| *G06F 3/14* | (2006.01) |
| *A63F 13/86* | (2014.01) |
| *G09G 5/393* | (2006.01) |
| *G06T 15/00* | (2011.01) |
| *A63F 13/497* | (2014.01) |

(52) U.S. Cl.
CPC ................ *G06T 1/20* (2013.01); *A63F 13/86* (2014.09); *G06F 3/1454* (2013.01); *G06T 15/005* (2013.01); *G09G 5/393* (2013.01); *A63F 13/497* (2014.09); *G09G 2340/16* (2013.01); *G09G 2350/00* (2013.01); *G09G 2358/00* (2013.01); *G09G 2360/08* (2013.01); *G09G 2370/20* (2013.01)

(58) Field of Classification Search
CPC ..... G06F 9/5044; G06T 9/00; G06T 2200/28; H04N 19/156; H04N 19/196; H04N 19/10; H04N 19/136; G09G 2340/02; G09G 2350/00; G09G 5/005; G09G 5/006
See application file for complete search history.

(56) References Cited

U.S. PATENT DOCUMENTS

| | | | |
|---|---|---|---|
| 7,073,070 B2 * | 7/2006 | Girard ..................... | G06F 21/84 713/166 |
| 7,822,278 B1 | 10/2010 | Hobbs et al. | |
| 8,028,040 B1 | 9/2011 | Hobbs et al. | |
| 8,766,993 B1 | 7/2014 | Hobbs | |
| 9,049,271 B1 | 6/2015 | Hobbs et al. | |
| 2007/0024705 A1 * | 2/2007 | Richter .............. | H04N 7/17318 348/142 |
| 2011/0050712 A1 | 3/2011 | Jackson | |
| 2011/0083131 A1 | 4/2011 | Pirzada et al. | |
| 2014/0073298 A1 | 3/2014 | Rossmann | |
| 2014/0098110 A1 | 4/2014 | Ju et al. | |
| 2014/0181806 A1 | 6/2014 | Abiezzi et al. | |
| 2014/0244992 A1 | 8/2014 | Wang | |

(Continued)

OTHER PUBLICATIONS

European Search Report for European Application No. 17154171 dated Feb. 17, 2017, 6 pages.

(Continued)

*Primary Examiner* — Hau H Nguyen
(74) *Attorney, Agent, or Firm* — TraskBritt (57) ABSTRACT

A method for extracting display data from a computing resource of a computer system comprises the dynamic selection of a display capturing mode among a plurality of display capturing modes.

12 Claims, 4 Drawing Sheets

(56) References Cited

U.S. PATENT DOCUMENTS

2015/0009222 A1    1/2015   Diard et al.
2015/0237356 A1    8/2015   Wu et al.
2015/0278585 A1*  10/2015   Laksono ............ G06K 9/00288
                                                              382/103

OTHER PUBLICATIONS

Jhawar et al., Dependability-Oriented Resource Management Schemes for Cloud Computing Data Centers, Handbook on Data Centers, S.U. Khan and A.Y. Zomaya Eds, Springer, 2015, 18 pages.
French Preliminary Search Report for French Application No. 1650883 dated Oct. 14, 2016, 2 pages.

\* cited by examiner

| Capturing mode | ON/OFF | Accelerated 2D/3D window | 2D/3D full screen | Protection flag | Latency | Quality | Resources | User priority | Frequency |
|---|---|---|---|---|---|---|---|---|---|
| Capturing mode 1 | OFF | NO | YES | YES | 1 | 3 | 1 | 1 | Still |
| Capturing mode 2 | ON | NO | YES | YES | 2 | 4 | 2 | 2 | Animated |
| Capturing mode 3 | ON | YES | YES | NO | 3 | 5 | 3 | 3 | Still |
| Capturing mode 4 | ON | YES | NO | NO | 5 | 2 | 5 | 4 | Animated |

METHOD FOR SELECTING A DISPLAY CAPTURING MODE

PRIORITY CLAIM

This application claims the benefit of the filing date of French Patent Application Serial No. 1650883, filed Feb. 4, 2016, for "Method for Selecting a Display Capturing Mode."

TECHNICAL FIELD

The present invention generally relates to a method for extracting display data from a computing resource.

BACKGROUND

Advances in computer technology have made it economical for individual users to have their own computing system, which caused the proliferation of the Personal Computer (PC). Individual PC usage is very diversified, going from standard office operations or Internet surfing to high-quality video watching or gaming.

Continued advances of this computer technology make these personal computers more and more powerful, but also complex and difficult to manage. For this and other reasons, there is a growing interest to separate the user interface devices, including the display and keyboard, from the application processing parts of the computing system. In this remote case, the user interface devices are physically located at the desktop, while the processing and storage components of the computer are placed in a hosting location. The user interface devices are then connected to the processor and storage components of the host computer system, with some means of communication. This is the advent of cloud computing and "thin" or "zero" client concepts.

In any computing system configurations, either local or remote, users may need to capture the image displayed on a screen for further treatment (storing, streaming over a network, etc.). In such circumstances, the full integrity, high quality and low latency of the image is usually expected.

For instance, game players sometimes record their game sessions to be able to analyze it later and improve their game performance. Other players are streaming their sessions on a network, to broadcast their performance. In the professional world, it is sometimes necessary to provide remote control of a computer system for maintenance, and it is then useful to stream the displayed information to the remote machine.

Display data (i.e., the data stored in a computing resource of a computing system that represent the images displayed on the user screen) can be captured according to multiple different modes that have both advantages and drawbacks. Some display capturing modes are excellent in that they are close to zero latency, but they do not support images featuring 2D/3D objects or hardware-decoded video. Other capturing modes are adapted to such advanced images but require dedicated hardware or suffer from latency or reduced image quality.

In the known methods of extracting display data, the users are manually selecting the appropriate capture mode according to their specific circumstances. Users may have to switch manually from one mode to another depending on the applications they intend to run, the content of the displayed image, the performance of the computing system and the availability of certain peripherals of the computing system.

BRIEF SUMMARY

An object of the invention is to propose a method of extracting display data from a computing resource of a computer system that is simpler and more efficient than the method of the prior art.

To this effect, the invention relates to a method for extracting display data from a computing resource, which includes the dynamic selection of a display capturing mode among a plurality of display capturing modes.

Since, the capturing mode is dynamically selected, the user is freed from manually switching from one capturing mode to another, in particular, when he is switching applications.

According to further non-limitative features of the invention, either taken alone or in combination:
- the dynamic selection comprises a step A of preparing of a display capturing mode capability table;
- the dynamic selection of a display capturing mode includes:
  - a step B of determining characteristics of the display data;
  - a step C of selecting, in the display capturing mode capability table, the display capturing mode most adapted to the characteristic of the display data;
  - a step of switching to the selected display capturing mode, if it is different from the current display capturing mode;
- the steps B, C and D or the steps A, B, C and D are repeated iteratively;
- the step B comprises determining the "acceleration characteristic" of whether at least some display data have been generated by 2D/3D acceleration;
- the acceleration characteristic is obtained by monitoring a 2D/3D acceleration solicitation of a graphics processing unit;
- the acceleration characteristic is obtained by identifying a predetermined pattern in the display data;
- the display data comprise a plurality of frames, and the acceleration characteristic is obtained by identifying a predetermined pattern in a sequence of frames;
- further comprising extracting display data by an alternate display capturing mode compatible with 2D/3D generation to confirm the acceleration characteristic;
- the step B comprises determining the "protection characteristic" of whether at least some display data are protected from reading;
- the display capturing mode capability table comprises, for each display capturing mode at least one of the following features: availability, 2D/3D acceleration support, protected display data support, latency, image quality, and computing resources use.

BRIEF DESCRIPTION OF THE DRAWINGS

Many other features and advantages of the present invention will become apparent from reading the following detailed description, when considered in conjunction with the accompanying drawings, in which.

DETAILED DESCRIPTION

Figure 1:
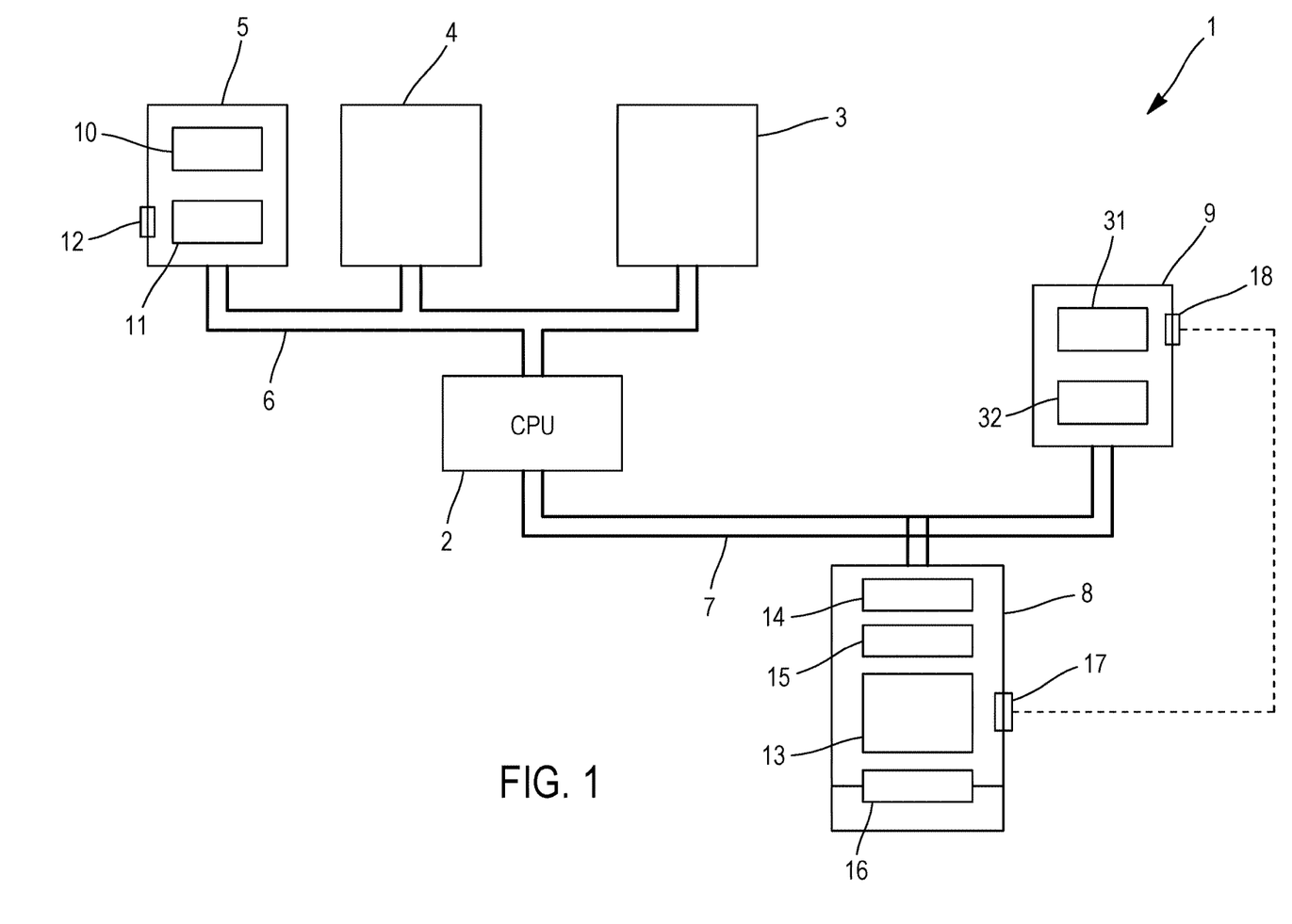
FIG. 1 depicts a computer system that supports the method for extracting display data according to the invention.

FIG. 1 depicts an exemplary computer system 1 that supports the method for extracting display data according to the invention.

The computer system 1 comprises a central processing unit (CPU) 2 operatively connected to a main memory 3 and to peripheral devices 4, 5 through a system bus 6. As known to those skilled in the art, system bus 6 comprises a data portion, address portion and control portion that allow the CPU 2 to read/write data to/from the main memory 3, or the memory or registers of any connected peripheral devices 4, 5.

CPU 2 is also operatively connected to one or more extension bus 7 (such as a PCI or AGP extension bus) that allows data to be transferred from/to further peripheral devices 8, 9 (such as a graphics card, storage, network controller, or other form of input/output interface).

In the computer system 1 depicted in FIG. 1, the system bus 6 is used to address both the main memory 3 and the peripheral devices 4, 5; sharing the same address space and thus providing to the CPU 2 read/write access to any accessible memory location, either located in the main memory 3, or located in any one of the connected peripheral devices 4, 5. In an alternative configuration, compatible with the present invention and not depicted on FIG. 1, peripherals 4, 5 are all connected to the extension bus 7, along with additional peripheral devices 8, 9, and have separate address space from the main memory 3.

In the computer system 1, peripheral devices 8, 9 connected to the extension bus 7 may obtain direct access to the memory space addressed by the system bus 6; this allows exchange of data between the main memory 3, peripheral devices 4, 5 with the additional peripheral devices 8, 9 connected to the extension bus 7, without involving the CPU 2.

In the particular example of FIG. 1, peripheral device 5 is a video adapter for connecting a monitor and displaying information to a user. The video adapter 5 comprises video memory 10, a conversion circuit 11 and at least one video output port 12. The video adapter 5 usually does not comprise any dedicated graphics processing unit, such as 2D/3D accelerator or audio/video decoder.

The video memory 10 is provided to temporarily store display data provided by the CPU 2 or transferred from main memory 3 (or from other peripheral devices). The display data stored in the video memory 10 are processed by the conversion circuit 11 in the appropriate digital or analog format and provided at the video output port 12, for instance, of the VGA, DVI or HDMI type. Video output port 12 can be connected to a video monitor using appropriate cables, in order to display to the user the image corresponding to the display data.

In operation, display data generated by the CPU 2 are usually stored in a dedicated area of the main memory 3, and regularly transferred to video memory 10. In some configurations, the video adapter 5 is not provided with any video memory 10 or with limited capacity of video memory 10, and in such cases, the display data are stored in main memory 3 and transferred essentially directly to conversion circuit 11.

Since the video adapter 5 does not contain dedicated 2D/3D acceleration or a video decoder, the display data that are stored in the video memory 10 and/or main memory 3 and eventually the image displayed to the user from output port 12 may lack certain image features such as complex 2D/3D rendering.

Continuing with the description of the computer system 1 of FIG. 1, peripheral device 8 that is connected to extension bus 7 is a graphics card. As is well known in the art, graphics card 8 comprises a graphics card memory 13, which, similarly to video memory 10, stores display data. It also comprises a graphics processing unit (GPU) 14 that receives instruction and data, for instance, from CPU 2, through the extension bus 7. When both video adapter 5 and graphics card 8 are present, computer system 1 may be configured to only activate one of these two resources.

Graphics Processing Unit 14 is processing the instruction and data received and provides corresponding display data into the graphics card memory. The GPU 14 may also instruct the transfer of the display data stored into the main memory 3 or stored into the video memory 10 of the video adapter 5 to the GPU card peripheral 7, through system bus 6 and extension bus 7, preferably without involving CPU 2. Display data coming from the main memory 3 or video memory 10 are combined with display data generated by the GPU and/or decoder and stored in the graphics card memory 13.

Graphics card 8 also usually comprises a decoder 15 to transform, for instance, encoded video (and/or audio) data (such as H.264 files) into display data for storage into the graphics card memory 13. Such encoded video (and/or audio) data may be provided by a DVD player, a hard disk, or any other peripheral connected onto the extension or system bus 7, 6.

A graphics card conversion unit 16 processes the display data stored into the graphics card memory 13 and provides them at graphics card video output port 17, in a fashion similar to the function performed by video adapter 5.

Computer system 1 may comprise further peripherals connected to the extension bus. For instance, peripheral 9 of FIG. 1 is a video capture card (either directly connected to the extension bus 7, as depicted in FIG. 1, or connected through an input/output connector, such as a USB connector).

The video capture card 9 is provided with one or more input connectors 18 (analog jack, DVI, HDMI connector) for receiving analog or digital video signals. As shown in FIG. 1, the input connector of video capture card 9 is connected by an appropriate cable to a corresponding connector of the graphics card video output port 17. The video capture card 9 also comprises a circuit 31 that receives and processes the incoming video signal from connector 18 and transforms it into a stream of display data. This may involve numerical sampling of the incoming video signal, if the selected input connector is of analog format.

Video capture card 9 may be provided with its own video memory 32 to store the display data generated by circuit 31. Alternatively (or in addition), the captured display data may be provided on the extension bus 7 for their storage into main memory 3, or in other storage devices connected to the computer system 1 (hard disk, USB drive, Flash memory card, etc.). For ease of explanation, the memory into which the captured display data are stored will be named "capture card memory," independently of where this memory is actually located.

Figure 2:
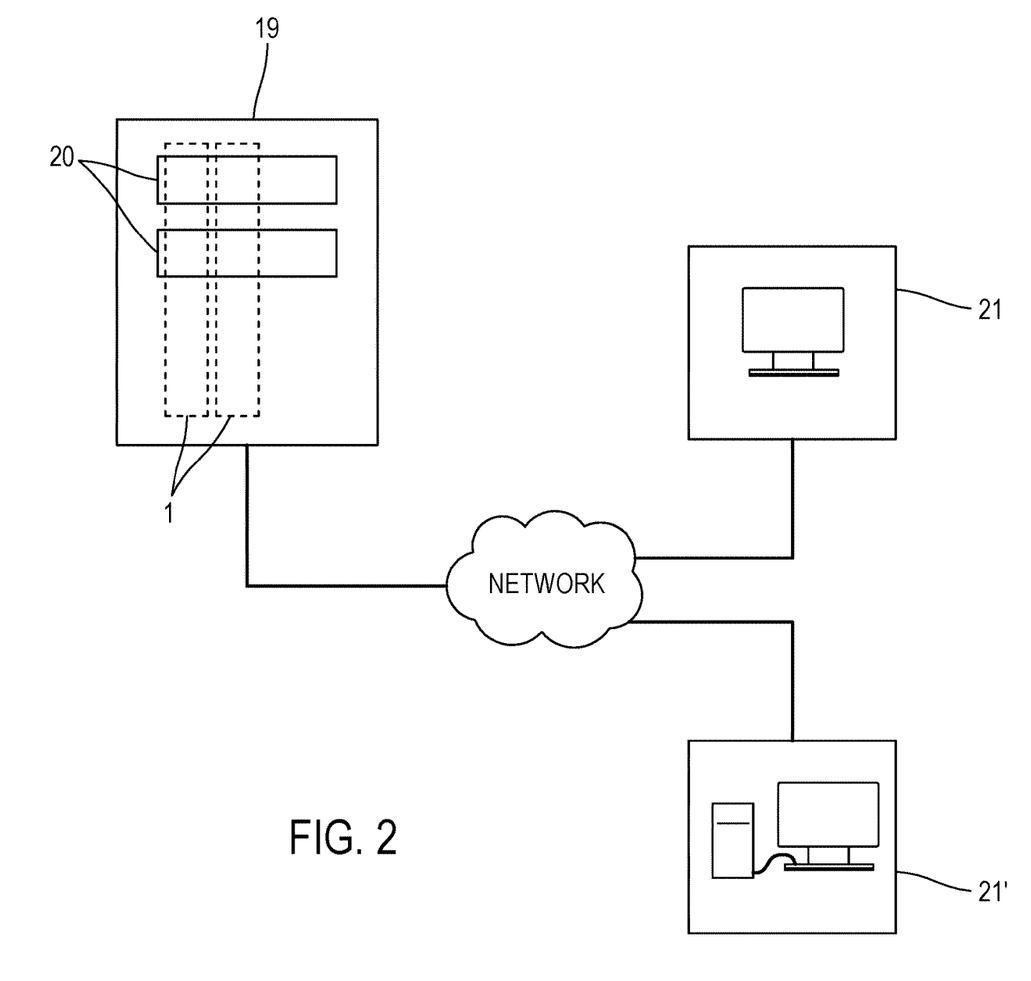
FIG. 2 depicts a computing architecture to implement a computer system that supports the method for extracting display data according to the invention.

It will be recognized that the computer system 1, although described in terms of structural elements such as "card" and "unit," may comprise or be constituted entirely of software. For example, and as shown in FIG. 2, a host computer 19 may comprise a plurality of servers 20. As it is well known, the servers 20 may be configured to host one or a plurality of virtual computer systems 1, along with its operating system and applications.

Each virtual computer system 1 in host computer 19 may be dedicated to one particular user. The users may interact with their dedicated virtual computer systems 1 from remote systems 21, 21', each connected to the host computer 19 through a network such as the Internet. Since most, if not all, of the processing is performed at host computer 19, the remote systems 21, 21' may be kept very simple and may comprise, for instance, a simple terminal, network connector and basic input/output devices (keyboard, mouse, etc.) such as represented by remote system 21 in FIG. 2, Alternatively, it could be a standard personal computer, with its own CPU, graphics card, peripherals, etc., such as represented by remote system 21'.

To display images on the user terminal, the host computer 19 provides display data to the remote system 21, 21' over the network (and possibly with additional sound or control data for input/output devices located at the remote system 21).

Conversely, the remote system 21 provides to the host computer 19 control data from input/output devices located at the remote site (keyboard, mouse), and possibly other forms of data, such as display and sound data, provided by a USB or built-in camera and microphone of the remote system, or network devices at the remote system 21, such as printers, etc.

Data exchanged between the host computer 19 and the remote system 21 may be compressed in order to limit bandwidth usage of the network.

Independently of whether the computer system 1 is provided in hardware form of in virtual form, the invention provides a method for extracting display data from a computing resource (such as a peripheral device, memory, etc.) of computer system 1.

By "extracting," it is meant that the CPU 2 is running instructions to initiate the read-out of display data from a computing resource such as memory or circuit 31 of the capture card 9. The read-out display data can then, for instance, be temporarily stored in main memory 3 for further treatment (encoding, compression) before they are sent out of the computer system 1, for instance, over a network connector peripheral of the extension bus 7. In an alternative, the read-out display data may be stored in a peripheral storage device connected to the extension bus 7, such as a hard drive.

As mentioned above, extracting display data from a computing resource can be useful in the context of the computing architecture of FIG. 2, where display data generated in the virtual computer system 1 of host computer 19 should be provided at remote system 21. It can also be useful, in the context of a hardware implementation of computer system 1, to allow a user to record or stream over the network the images formed on its display (which generally is connected to the video output port 17 of the graphics card 8 or to the video output port 12 of video adapter 5), as it may be necessary for business or leisure reasons.

There exist different approaches for obtaining display data, each approach being named a "display capturing mode" (or more simply "capturing mode"), depending on the actual computer system 1 configuration, usage and load, and depending on the nature of the displayed images. Each capture mode is extracting the display data from a specific computing resource.

According to a first capturing mode, the display data are extracted from main memory.

This mode may be particularly fast, and thus exhibit low latency (i.e., the period between the time one image is generated by the CPU 2 or GPU 14, and the time the corresponding display data are extracted by the capture mode).

However, this mode is not appropriate when the images that are to be displayed include accelerated 2D/3D objects or a dedicated video decoder. Since video adapter 5 or CPU 2 does not include the necessary resources to process those elements, the adequate display data cannot be generated. Instead, the display data stored in video memory 10 will comprise predetermined patterns that will correspond to a black, white or grey area in the image eventually displayed.

According to a second capturing mode, the display data are extracted directly from the graphics card memory 13 of the graphics card 8. Such approach usually allows extraction of display data corresponding to the full image, even when this image comprises accelerated 2D/3D objects or decoded video. However, this capturing mode is imposing a huge load to the computer system 1, since the graphics card 8 and the computer system 1 were not designed to transport the graphics card memory content over extension bus 7. Also, this second capturing mode requires knowing the location (range of memory addresses) of display data in the graphics card memory 13. Since some applications may select to store display data in non-conventional locations of that memory, this second capturing mode may not be always available or accurate.

The display data stored in graphics card memory 13 may be associated with a "protection flag" that prevents their extraction from memory. This is particularly the case when the display data contains protected content, for instance, from a copyrighted source (DVD, or Video on Demand services, for instance). In such circumstances, the extracted display data will be presenting a predetermined pattern (corresponding usually to a black, grey or white area in the image) instead of the expected display data.

According to another exemplary capturing mode, the display data are extracted from the capture card memory 32 or from the capture card circuit 31. This mode usually allows obtaining display data that are very representative of the actual displayed image (including 2D/3D objects and decoded video that may be incorporated in such images) but suffer from a general lower quality (arising from the degradation occurring in successive encoding/decoding of the video signal) and a significant latency.

A further exemplary capturing mode is available when video adapter 5 is a virtual video adapter (for instance, emulated by software running on a server 20 of host system 19). In such a configuration, the display data can be read and extracted from the virtual video output port of the virtual video adapter 5.

Depending on the actual configuration of the computer system 1, and or the available peripheral, there may be additional capturing modes available. In addition, some of the capturing modes described above may not always be available; for instance, video capture card 9 or video adapter 5 may not be present or may be faulty in the computer system 1.

The method for extracting display data according to the invention includes the dynamic selection of a display capturing mode among a plurality of such modes. By "dynamic," it is understood that the selection is performed automatically, from time to time, or repeatedly, in order to select an appropriate capturing mode adapted to the current configuration and/or usage and/or load of the computing system 1, and to the nature of the displayed image, and/or the content of the display data, and/or performance of the capturing process (e.g., latency).

Figure 3:
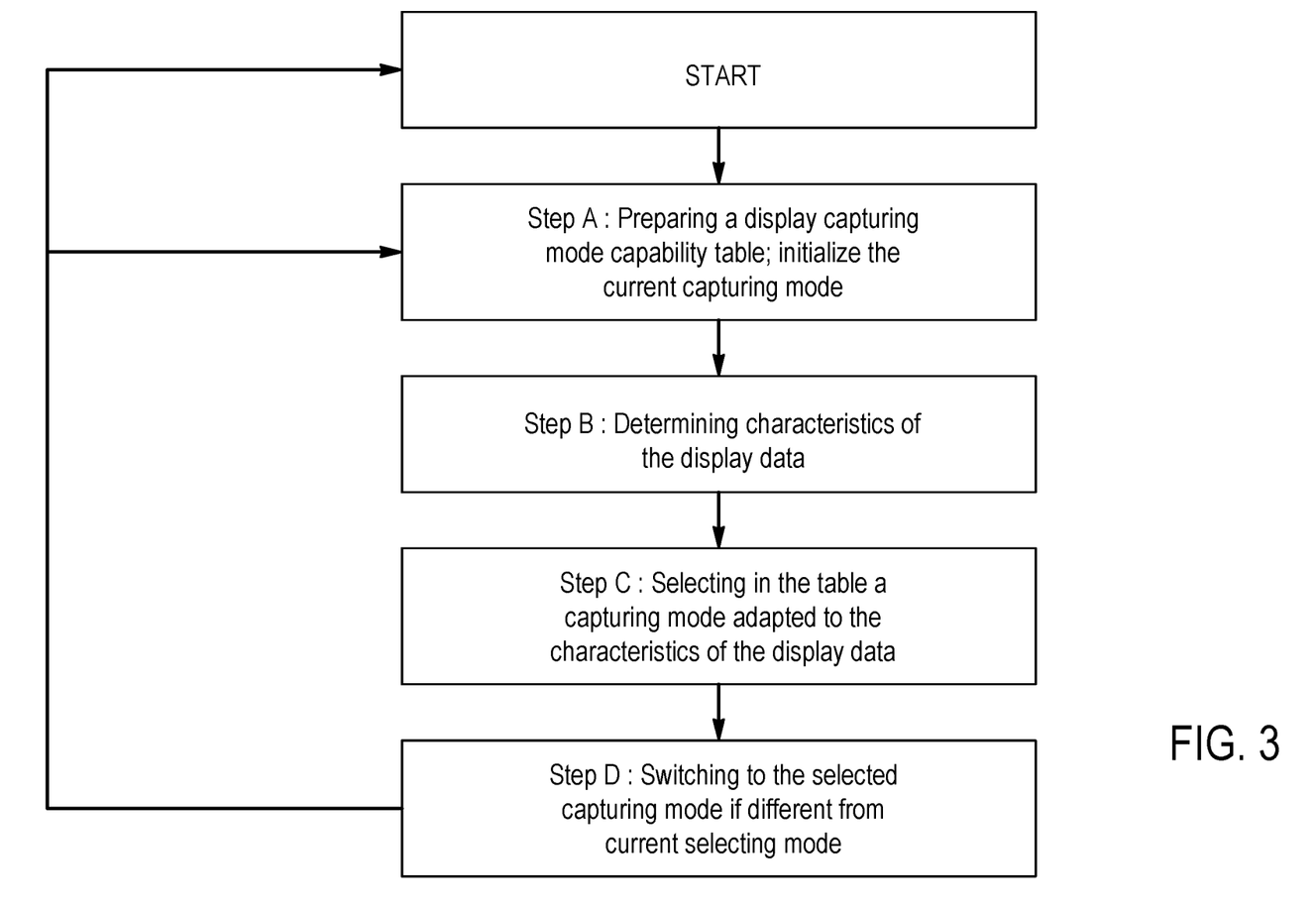
FIG. 3 depicts a particular embodiment of the method according to the invention.

FIG. 3 depicts a particular embodiment for such a method. The method may be represented in the computer system 1 by software instructions executed by CPU 2 and stored in the main memory 3.

The method is initiated ("Start" box on FIG. 3) from an instruction to capture display data. This instruction may be generated by the user of computer system 1. It may also be generated by another application running on computer system 1 (or host computer 19 in the case of the computing architecture of FIG. 2).

In a step A, the method comprises preparing a display capturing mode capability table.

This table may be pre-existing or partially pre-existing and stored in the main memory 3 or in a memory external to the computer system of FIG. 1 (i.e., on an external storage).

The table associates the capturing modes to their characteristics.

Figure 4:
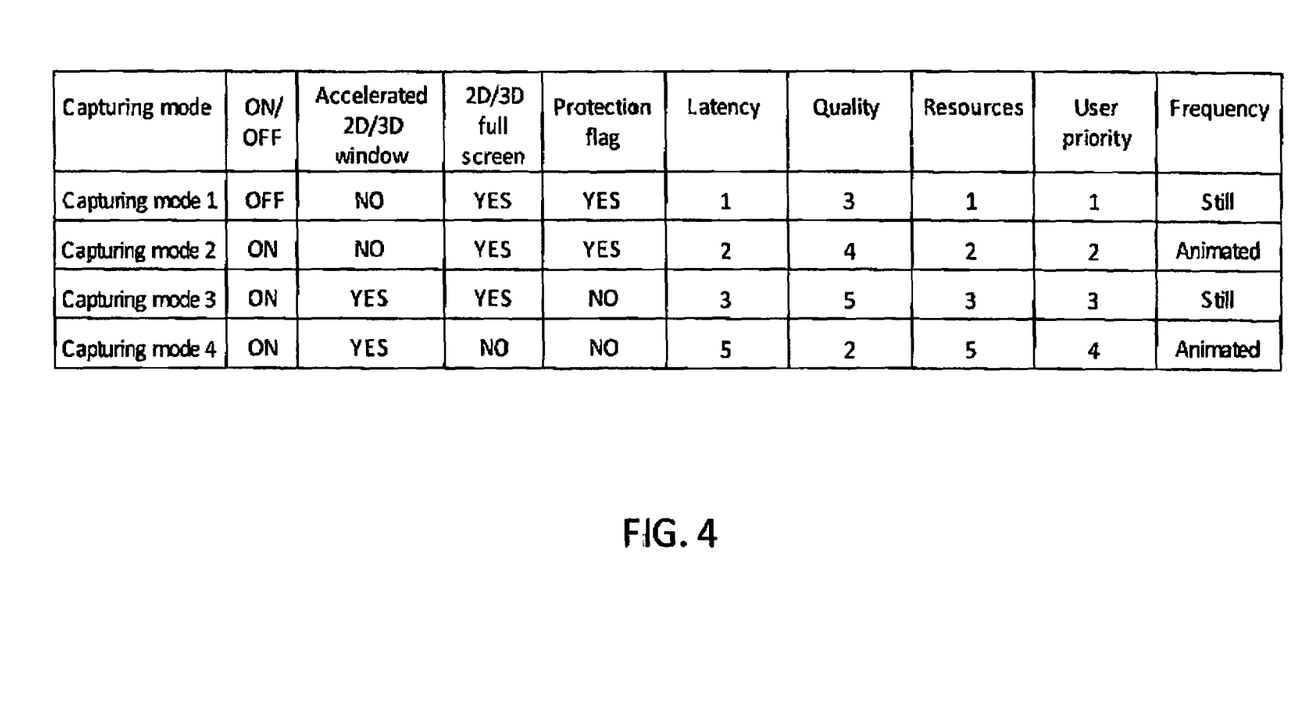
FIG. 4 depicts an exemplary capturing mode capability table.

An example of such a capturing mode capability table is presented on FIG. 4, but the invention is not limited to the represented list of characteristics, nor to the representation, in computer system 1, of the represented capability table under the form of a table.

The first column of the table corresponds to a predefined list of capturing modes. This can be an exhaustive list of possible capturing modes.

The second column indicates whether the corresponding capturing mode is available in the computer system 1. This information can be established dynamically by detecting on the system bus 6 or extension bus 7 the presence or absence of the underlying peripheral (e.g., video adapter 5, video capturing card 9, graphics card 8, etc.) that is supporting the capturing mode in question. This presence can either be in its physical form or in virtual form.

The third column, named "accelerated 2D/3D window," indicates whether the capturing mode is able to extract display data corresponding to image incorporating 2D/3D accelerated features or decoded video, in a partial area of the screen (window).

The fourth column, named "2D/3D full screen," indicates whether the capturing mode is able to extract display data corresponding to images incorporating 2D/3D accelerated features or decoded video, displayed on the full screen area.

The fifth column, named "protection flag," indicates whether the capturing mode is able to extract protected or encrypted display data.

The sixth column, named "latency," indicates a latency performance value. The latency performance value can be predefined for each capturing mode, but according to a preferred embodiment, the latency performance value is established during step A. For instance, this can be done by having the CPU 2 execute the following steps:

Display on the screen a unique pattern, and start a clock counter.

Extract display data using the capturing mode(s) for which the latency performance is to be assessed.

Upon identification of the unique pattern into the extracted display data from a capturing mode, associate the value of the clock counter to the capturing mode.

Assess the latency performance of the capturing mode(s) based on the clock counter value(s) (generally speaking, the higher the value of the clock counter, the lower the performance).

The seventh column of the capturing mode capability table, named "quality," indicates the quality of the image reconstructed from extracted display data. Usually, this information is predefined for each capturing mode of the predefined list, but can also be reported by each capturing mode itself.

The eighth column, named "resources," indicates the load imposed on computer system 1 while the capturing mode is running. This "resources" characteristic may be predefined or established dynamically during step A. This can be easily done, for instance, by comparing the CPU 2 usage and/or system and extension bus traffic, or main memory 3 usage while the capturing mode is running and while the capturing mode is not running.

The ninth column, named "user priority," indicates which capturing mode is the priority capturing mode, i.e., the preferential order for selecting a capturing mode when such a decision is to be taken, for instance, upon starting the method according to the Invention.

The tenth column, named "frequency," indicates the capability of the corresponding capturing mode with respect to the nature of the image. Some capturing modes may be more adapted for extracting display data corresponding to "still images," like desktop representation or office applications; other capturing modes may be more adapted for extracting display data corresponding to "animated images," such as movies or video games.

At the end of step A, the display capturing mode capability table, such as the one depicted in FIG. 4, is stored in main memory 3.

Also, in step A, an initial capturing mode is selected as the current capturing mode. This selection can be made among the available capturing modes (as indicated by the second column of the table), for instance, based on the user priority value of the ninth column, or even randomly chosen among the available capturing modes. Display data are then extracted by this initial capturing mode from the appropriate computer resource of the computer system 1 and provided in the main memory 3 or on extension bus 7.

Returning to FIG. 3, the particular embodiment of the method according to the invention further comprises a step B of determining the characteristics of the extracted display data.

For instance, it is determined whether at least some extracted display data have been generated or should have been generated by 2D/3D acceleration. These "acceleration characteristics" can be obtained in multiple ways. According to a first approach, the acceleration characteristic is determined by monitoring a 2D/3D acceleration solicitation of, the graphics processing unit 14. This can be obtained by determining if instructions on the extension bus 7 are directed to the graphics processing unit 14. According to a second approach, the acceleration characteristic is obtained by identifying a predetermined pattern (for instance, corresponding to a black, grey or white area on the corresponding image) in the extracted display data. The presence of a predetermined pattern may indicate the image is incorporating 2D/3D accelerated features that cannot be accommodated by the current capturing mode. In other terms, it indicates that the extracted display data should have been generated by 2D/3D acceleration.

When the displayed images are animated, the display data are formed from a plurality of frames, each frame corresponding to an image, in a sequence of images. In that case, the acceleration characteristics can be preferably obtained by identifying the predetermined pattern in a sequence of frames, rather than in a single frame of display data. This allows confirming the acceleration characteristics with better certainty.

To further confirm the acceleration characteristics, it is possible to extract display data using an alternative capturing mode, known from the table of FIG. 3 to be compatible with 2D/3D acceleration. If the display data extracted by this alternative capturing mode is not exhibiting the predetermined pattern, this confirms the "acceleration characteristic" of the display data extracted using the current capturing mode. Also, the size of the pattern (in terms of corresponding image pixels) allows identification if there is a need for "full screen" capability or "window" capability.

The extracted display data, at this step B, can also be examined to determine if they exhibit "protection characteristics" of whether at least some display data are protected from reading. This can simply be done by identifying the presence or absence of the "protection flag" in the display data.

In a further example of the treatments that can be performed in this step B of determining the characteristics of the extracted display data, it can be determined if extracted display data under the current capturing mode correspond to "still images" or to "animated images." This can be achieved by measuring the variation of the display data from one frame to another in a sequence of frames.

With continued reference to FIG. 3, the method further comprises a step C of selecting, in the display capturing mode capability table, a display capturing mode adapted to the characteristics of the display data.

Among the available capturing modes (indicated as "ON" in the second column of the table), the capturing mode featuring the capability of the characteristics identified in the previous step is selected. In the case where there are multiple capturing modes, the capturing mode that exhibits the highest performance (for instance, according to latency, quality or performance characteristics of the capability table) is selected. Also, the user priority value of the capability table can also be used to further discriminate among multiple possible choices.

In step D of the method depicted in FIG. 3, the current capturing mode is switched to the selected capturing mode, if they are different.

The display data are then extracted from the capturing resources of computer system 1, using the new, current capturing mode. Depending on the computer system 1 configuration, usage and/or load and depending on the nature of the displayed images, the display data are automatically selected from the most appropriate computing resource: for instance, from video memory 10 of video adapter 5, from graphics card memory 13 of graphics card 8, or from video recorder memory 32. As mentioned above, the extracted data can be provided on system bus 6 or extension bus 7 for being either streamed out or stored in a storage peripheral, or even stored in main memory 3.

After step D, the method according to the invention is pursued by either being redirected to step A or to step B. For instance, step A can be selected once every hundred or thousand loops to regularly update the capturing mode capability table and take into account changes in configuration, usage or load of computer system 1.

The method, therefore, leads to the dynamic selection, without any user intervention, of the capture mode, taking into account the computer system 1 characteristics and operational performance, and the nature of the images generated in the computer system 1.

What is claimed is:

1. A method for extracting display data from a computing resource of a computing system, the method comprising:
dynamically selecting a display capturing mode among a plurality of display capturing modes based on a relationship between the display capturing mode and one or more characteristics of the display data, the display capturing mode for extracting the display data from a specific computing resource among a plurality of computing resources of the computing system; and
extracting the display data from the specific computing resource, the extracting comprising initiating read-out of the display data from the specific computing resource according to the selected display capturing mode.

2. The method for extracting display data according to claim 1, wherein the dynamic selection of the display capturing mode comprises a step A of preparing a display capturing mode capability table.

3. The method for extracting display data according to claim 2, wherein the dynamic selection of a display capturing mode includes:
a step B of determining the one or more characteristics of the display data;
a step C of selecting, in the display capturing mode capability table, the display capturing mode most adapted to the one or more characteristics of the display data; and
a step D of switching to the selected display capturing mode, if it is different from the current display capturing mode.

4. The method for extracting display data according to claim 3, wherein the steps B, C and D are repeated iteratively.

5. The method for extracting display data according to claim 3, wherein the steps A, B, C and D are repeated iteratively.

6. The method for extracting display data according to claim 3, wherein the step B comprises determining the "acceleration characteristic" of whether at least some display data have been generated by 2D/3D acceleration.

7. The method for extracting display data according to claim 6, wherein the acceleration characteristic is obtained by monitoring a 2D/3D acceleration solicitation of a graphics processing unit.

8. The method for extracting display data according to claim 6, wherein the acceleration characteristic is obtained by identifying a predetermined pattern in the display data.

9. The method for extracting display data according to claim 8, wherein the display data comprises a plurality of frames, and the acceleration characteristic is obtained by identifying the predetermined pattern in a sequence of frames.

10. The method for extracting display data according to claim 8, further comprising extracting display data by an alternate display capturing mode compatible with 2D/3D generation to confirm the acceleration characteristic.

11. The method for extracting display data according to claim 3, wherein the step B comprises determining the "protection characteristic" of whether at least some display data are protected from reading.

12. The method for extracting display data according to claim 2, wherein the display capturing mode capability table comprises, for each display capturing mode, at least one of the following features: availability; 2D/3D acceleration support; protected display data support; latency; image quality; and computing resources use.

* * * * *

UNITED STATES PATENT AND TRADEMARK OFFICE
CERTIFICATE OF CORRECTION

PATENT NO. : 10,600,140 B2
APPLICATION NO. : 15/424491
DATED : March 24, 2020
INVENTOR(S) : Emmanuel Freund and Asher Criou Page 1 of 1

It is certified that error appears in the above-identified patent and that said Letters Patent is hereby corrected as shown below:

In the Specification

| | | |
|---|---|---|
| Column 2, | Line 26, | change "a step of" to --a step D of-- |
| Column 5, | Line 13, | change "in FIG. 2," to --in FIG. 2.-- |
| Column 6, | Line 56, | change "and or the" to --and of the-- |
| Column 8, | Line 20, | change "to the Invention." to --to the invention.-- |
| Column 8, | Line 50, | change "solicitation of," to --solicitation of-- |

Signed and Sealed this
Ninth Day of June, 2020

Andrei Iancu
*Director of the United States Patent and Trademark Office*